(12) United States Patent
Cantu et al.

(10) Patent No.: US 8,641,412 B2
(45) Date of Patent: Feb. 4, 2014

(54) COMBUSTION EFFICIENCY CONTROL SYSTEM FOR A LAMINAR BURNER SYSTEM

(75) Inventors: Teodoro A. Cantu, Mission, TX (US); Ulric Teodoro Alejandro Cantu, McAllen, TX (US); Ervin Eliud Torres Gomez, Reynosa (MX)

(73) Assignee: Resource Rex, LLC, McAllen, TX (US)

( * ) Notice: Subject to any disclaimer, the term of this patent is extended or adjusted under 35 U.S.C. 154(b) by 0 days.

(21) Appl. No.: 13/566,813

(22) Filed: Aug. 3, 2012

(65) Prior Publication Data

US 2012/0295206 A1 Nov. 22, 2012

Related U.S. Application Data

(62) Division of application No. 13/071,658, filed on Mar. 25, 2011.

(51) Int. Cl.
*F23N 1/02* (2006.01)
*F23C 5/32* (2006.01)
*F23C 5/00* (2006.01)
*F24C 5/02* (2006.01)

(52) U.S. Cl.
USPC ............... 431/89; 431/173; 431/174; 126/44

(58) Field of Classification Search
USPC ................... 431/89, 173, 174; 126/44
See application file for complete search history.

(56) References Cited

U.S. PATENT DOCUMENTS

| | | |
|---|---|---|
| 4,021,186 A | 5/1977 | Tenner |
| 4,054,028 A | 10/1977 | Kawaguchi |
| 4,245,980 A | 1/1981 | Reed et al. |
| 4,286,945 A | 9/1981 | Vosper et al. |
| 4,403,947 A | 9/1983 | Spielman |
| 4,505,666 A | 3/1985 | Martin et al. |
| 4,519,770 A | 5/1985 | Kesselring et al. |
| 4,653,998 A * | 3/1987 | Sohma et al. .................... 431/79 |
| 4,777,932 A * | 10/1988 | Pennington ................... 126/290 |
| 5,240,404 A | 8/1993 | Hemsath et al. |
| 5,308,239 A | 5/1994 | Bazarian et al. |
| 5,388,985 A | 2/1995 | Musil et al. |
| 5,605,452 A * | 2/1997 | Robertson et al. ................ 431/8 |
| 5,807,094 A | 9/1998 | Sarv |
| 5,871,343 A | 2/1999 | Baukal, Jr. et al. |
| 6,238,206 B1 | 5/2001 | Cummings, III et al. |
| 6,773,256 B2 | 8/2004 | Joshi et al. |
| 6,843,185 B1 | 1/2005 | Taylor |
| 7,500,437 B2 | 3/2009 | Lefebvre et al. |
| 7,952,064 B2 * | 5/2011 | Haffner .................... 250/227.11 |
| 2008/0160467 A1 | 7/2008 | Shimazu et al. |
| 2010/0112500 A1* | 5/2010 | Maiello et al. .................. 431/76 |

\* cited by examiner

*Primary Examiner* — Kenneth Rinehart
*Assistant Examiner* — William Corboy
(74) *Attorney, Agent, or Firm* — Rafael V. Baca; Baca Law Firm, PLLC (57) ABSTRACT

A high efficiency laminar flow burner system for proving a stream of heat energy including a supply input module for providing fuel and laminar streams of air to a combustion manifold. The laminar air delivery system includes a damper, a blower, and an air delivery controller. The air delivery controller receives an efficiency signal to control the flow of a laminar air intake stream by adjusting the damper. The combustion manifold includes an air-fuel mixing system, a stoichiometric unit, and a refractory unit each coupled to one another. The laminar air intake stream traveling from the supply input module passes through a stoichiometric unit body to meet with a first combustion stream from an air-fuel mixing chamber within the stoichiometric unit body to define a second combustion stream. The second combustion stream then travels across the refractory passageway to define a third combustion stream.

3 Claims, 8 Drawing Sheets

COMBUSTION EFFICIENCY CONTROL SYSTEM FOR A LAMINAR BURNER SYSTEM

This application is a Divisional of a Continuation application Ser. No. 13/071,658 filed Mar. 25, 2011 which claims benefit under 35 U.S.C. §120 of a Non-Provisional application Ser. No. 12/790,912, filed May 31, 2010, entitled "A Laminar Flow Combustion System and Method for Enhancing Combustion Efficiency", by inventors Teodoro A. Cantú et al., the entirety of the above referenced Applications are hereby incorporated by reference as if fully set forth herein.

BACKGROUND

1. Field of the Invention

The present invention generally relates to combustion systems for enhancing efficiency as streams of laminar air and fuel mix. More particularly, but not by way of limitation, the present invention relates to a combustion system for generating an optimized combustion stream by directing a stream of preconditioned laminar air mixed with a fuel through a combination of stoichiometric combustion staging arrangements and refractory units.

2. Description of Related Art

The general concept of low nitrogen-oxide (NOx) burners is to produce a flame that provides heat energy though a high efficiency combustion process with minimal waste products arising from the combustion, namely oxides of nitrogen of which form the basis for environmental pollution such as acid rain and smog. The resulting heat energy is used in a variety of industrial applications such as for boilers in energy generation; for furnaces employed in applications requiring high heat such as smelting metals, distilling chemicals, petrochemicals and gas; paper manufacturing; and for flaring oil and gas wells. Similarly, such "high efficiency" burners seek to minimize a combination of other combustion waste products in addition to NOx such as oxides of carbon (COx) and total hydrocarbons (THC) among others to comply with federal and international governmental requirements especially for global warming prevention as well as to conserve natural resources by maximizing the burn efficiency of the requisite raw materials for combustion.

Presently, many high efficiency burners require various swirling techniques to maximize the efficiency of a high efficiency burner. Swirling is a widely used mixing process for homogenizing an air fuel mixture in the combustion process by which atomized fuel is introduced into a turbulent stream of air. However, various swirling techniques are often non-uniformly applied across the entire combustion chamber. Detrimentally, fuel and air can become drawn apart from the air fuel mixture to thereby compromise combustion efficiency as well as to spread waste fuel throughout the combustion chamber which requires routinely taking the high efficiency burner out of commercial operation to perform preventative maintenance for structural damage. Moreover, turbulent or swirled air provides an aerodynamic drag-effect that generally interrupts the rate at which air is initially supplied to a combustion chamber, and therefore consequently decreasing the operational efficiency of the burner. Furthermore, costly and often bulky low-waste emissions monitoring equipment are integrated with effluent towers of current high efficiency burner systems to ensure operational efficiency. Additional costs incur as emissions monitoring equipment shorten the operational time of such burners to ensure overall operation within low-waste emission requirements.

Unfortunately, there is no known device or method for successfully providing a "high efficiency" combustion system for leaving negligible waste products for sustained use with industrial applications without use of swirling techniques or derivations of swirling techniques. Therefore, a need exists for a system and method for generating an optimized combustion stream by directing a stream of preconditioned laminar air with a fuel through a combination of stoichiometric combustion staging arrangements and refractory units. There is also a need for a system and method for quickly and accurately increasing combustion efficiency for a various applications through linking a series of interchangeable reaction efficiency modules to the system. Many other problems and disadvantages of the prior art will become apparent to one skilled in the art after comparing such prior art with the present invention as herein described.

SUMMARY

Aspects of the present invention are found in a laminar flow burner system having a combustion manifold for establishing a combustion process that generates a high efficiency stream of heat energy. The laminar flow burner system includes a supply input module coupled to the combustion manifold and provides fuel and laminar streams of air thereto. The combustion manifold includes at least one air-fuel mixing system, one stoichiometric unit, and one refractory unit each coupled to one another. A first combustion stream is established at the air-fuel mixing chamber system as fuel is discharged from a plurality of injectors to mix with the laminar air intake stream traveling along a mixing chamber. In at least one aspect, the fuel exits from the plurality of injectors in a manner that is perpendicular to the laminar air intake stream. In one aspect, a pilot unit is provided within the mixing chamber and includes an electrical resistor for igniting the fuel as the fuel contacts the hot resistor.

The stoichiometric combustion unit includes a staging passageway and a stoichiometric unit body. A laminar air intake stream traveling from the supply input module and along the staging passageway passes through a stoichiometric unit body at a plurality of air intakes to meet and mix with the first combustion stream within to thus define a second combustion stream for introduction from the stoichiometric unit to the refractory unit. A refractory unit body is composed of refractory material to prevent absorption of heat energy to the refractory unit as the second combustion stream travels across a refractory passageway to define a third combustion stream. In one aspect, the third combustion stream exits the laminar burner system to thereby define an energy output for use with an energy consumption system.

In one aspect, a method for combusting air and fuel with a burner system using a laminar air intake stream is appreciated as follows. A laminar air intake stream is preconditioned prior to entering a combustion manifold of the laminar burner system. The laminar air intake stream is directed from the supply input module to an air-fuel mixing chamber system of the combustion manifold. The air-fuel mixing chamber system features the injector device having the plurality of injectors and the pilot unit positioned adjacent to the injector device.

In one aspect, a first combustion stream is established within the mixing chamber as the fuel is ejected from the plurality of injectors perpendicular to the laminar air intake stream and continuously ignited by the pilot unit as the pilot unit receives a voltage.

A second combustion stream is established within the stoichiometric combustion unit. As such, a laminar air intake stream is directed from the supply input module through a staging passageway to a stoichiometric unit body each of the stoichiometric combustion unit. The second combustion stream is established within a stoichiometric channelway as the laminar air intake stream from the staging passageway is injected through a plurality of air intakes of the stoichiometric unit body as the first combustion stream is directed from the mixing chamber through the stoichiometric channelway.

The second combustion stream is directed from the stoichiometric unit body through a refractory unit to establish a third combustion stream. The third combustion stream exits the laminar burner system to thereby define an energy output.

In one aspect, in addition to adjusting combustion efficiency through controlling the input supply of laminar air and fuel, the combustion process established by the combustion manifold can be adjusted to accurately modify combustion efficiency for various industrial applications through linking a series of interchangeable reaction efficiency modules within the combustion manifold. Moreover, one supply input module can be interchanged for another of differing configuration to accommodate demand for laminar air intake streams as varying quantities of reaction efficiency modules are either added to or removed from the combustion manifold.

In a further aspect of the present invention, for facilitating operation of a laminar burner system, a combustion efficiency control system is integrated with a laminar burner system. The combustion efficiency control system provides operational instructions for optimizing a high efficiency combustion process in the delivery of thermal energy to an energy consumption system coupled to the laminar burner system.

Other aspects, advantages, and novel features of the present invention will become apparent from the detailed description of the present invention when considered in conjunction with the accompanying drawings.

BRIEF DESCRIPTION OF THE DRAWINGS

The present invention is illustrated by way of example and not by limitation in the accompanying figures, in which like references indicate similar elements, and in which.

Skilled artisans appreciate that elements in the Figures are illustrated for simplicity and clarity and have not necessarily been drawn to scale. For example, the dimensions of some of the elements in the Figures may be exaggerated relative to the other elements to help improve understanding of the embodiments of the present invention.

DETAILED DESCRIPTION

For a more complete understanding of the present invention, preferred embodiments of the present invention are illustrated in the Figures Like numerals being used to refer to like and corresponding parts of the various accompanying drawings. It is to be understood that the disclosed embodiments are merely exemplary of the invention, which may be embodied in various forms.

FIGS. 1-3, 5, and 7 generally illustrate a laminar flow burner system 5 having a combustion manifold 70 for applying a combustion process that generates a high efficiency stream of heat energy. The laminar flow burner system 5 includes a supply input module 20 coupled to and providing fuel and laminar streams of air to the combustion manifold 70. The resulting high efficiency combustion stream is optimized for a variety of industrial applications such as for boilers in energy generation including heat, mechanical, and electric energy; propulsion systems; for furnaces employed in applications requiring high heat such as smelting metals and alloys, distilling chemicals, petrochemicals and gas; paper manufacturing; and for flaring oil and gas wells.

Accordingly, in at least one embodiment, the combustion process established by the combustion manifold 70 can be adjusted to accurately modify combustion efficiency for various industrial applications through linking a series of interchangeable reaction efficiency modules 800 within the combustion manifold 70 in addition to adjusting combustion efficiency through controlling the input supply of laminar air and fuel. Moreover, one supply input module 20 may be interchanged for another of differing configuration to accommodate varying quantities of reaction efficiency modules 800.

In this application, the terms "air" or "atmospheric air" refer to gasses surrounding the earth that provide oxygen as a fuel for combustion. In this application, the term "false start" refers to the termination of a combustion process as a pilot's ignition flame is blown out as a result of high fluid flow rates that arise from any combination of air flow or fuel flow into a combustion chamber of a burner. In this application, the term "stoichiometric" refers to a qualitative relationship of air and fuel to that of remaining combustion waste products, (examples referenced above such as, among others carbon dioxide), after undergoing chemical transformation from a gas state through an oxidation process during combustion where there is negligible or no amounts of organic carbon and other waste products left, for example with measured carbon dioxide emissions less than one part per million. In this application, the term "refractory" refers to a material for high-temperature operational use while exposed to temperatures at least above 1,000° C. In this application, the terms $N^{th}$ and $N^{th}-1$ respectively refer to: for any desired number of reaction efficiency optimization modules, sequentially the last reaction efficiency optimization module in a series of reaction efficiency optimization modules that define a combustion manifold and a reaction efficiency optimization module sequentially before the last reaction efficiency optimization module.

Specifically as viewed in FIGS. 1-3, 5, and 7, the laminar burner system 5 includes a damper 21 in fluid communication with a blower 25 such that the damper 21 controls the flow of atmospheric air to the blower 25. In that turbulent or "swirled" air techniques commonly employed by high efficiency burners provide a drag-effect that interrupts the rate at which air is initially supplied to a combustion chamber, the damper 21 in the present invention variably controls the flow rate of atmospheric air or, optionally, oxygen responsive to the combustion process executed by the combustion manifold 70 downstream. Accordingly, in general, a laminar air delivery system 22 that includes the damper 21 and the blower 25 that cooperatively operate to generate a laminar air intake stream for the laminar burner system 5.

Figure 1:
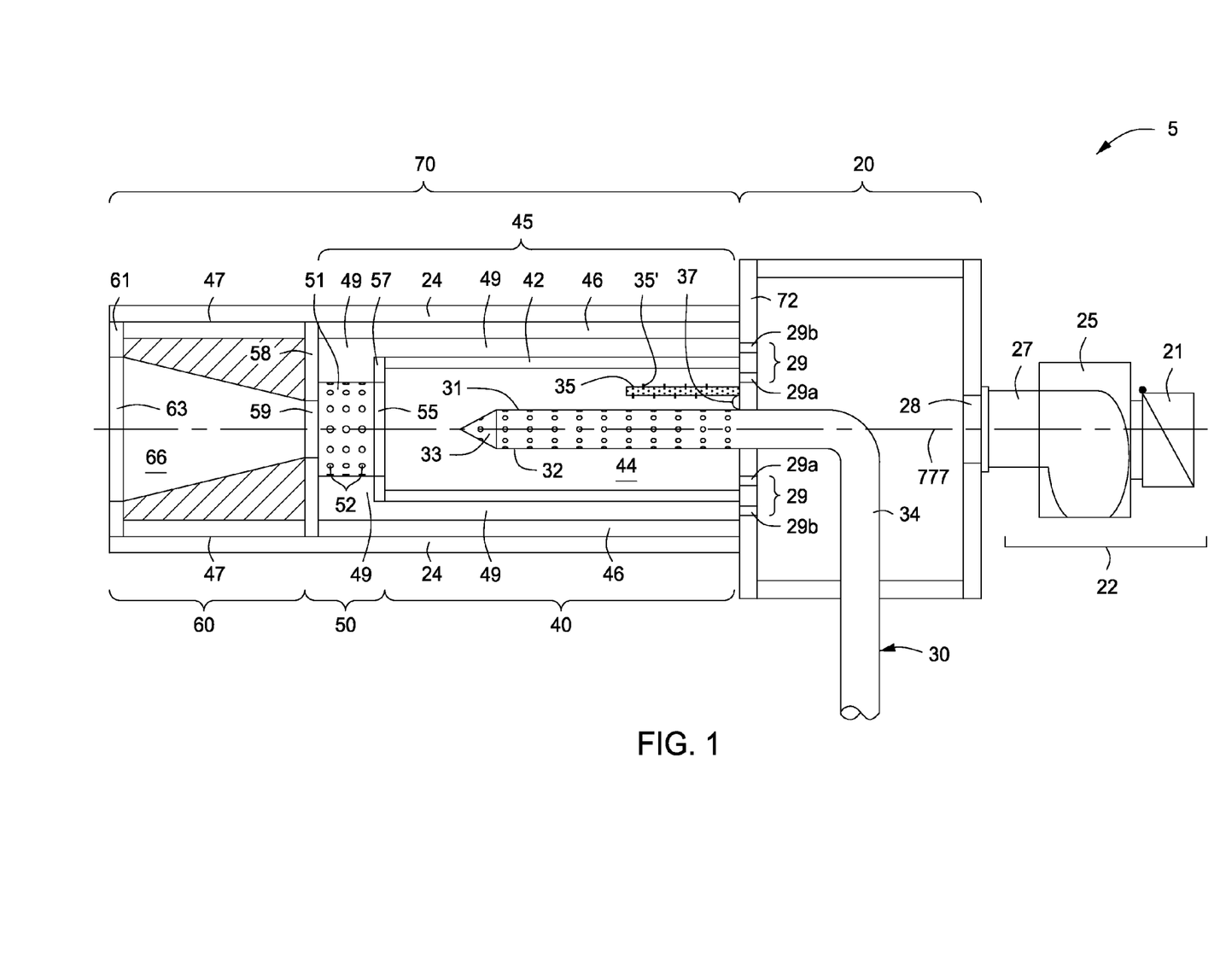
FIG. 1 is an schematic view from the side illustrating a burner system for generating heat energy by directing a stream of laminar air with a fuel from a supply input module through a combustion manifold having at least an air-fuel mixing chamber, a stoichiometric combustion unit, and a refractory unit.

Referring to FIG. 1, the laminar burner system 5 includes the laminar air delivery system 22, the supply input module 20, and the combustion manifold 70. In operation, atmospheric air or, optionally, oxygen is drawn through the laminar air delivery system 22, across the supply input module 20, and then introduced to the combustion manifold 70 as a laminar air intake stream. Similarly, fuel is directed across the fuel delivery system 30, through the supply input module 20, and discharged within the combustion manifold 70 to mix with the laminar air intake stream. Illustratively, in one embodiment, ten parts of laminar air to one part of fuel is mixed within the combustion manifold 70.

Figure 5:
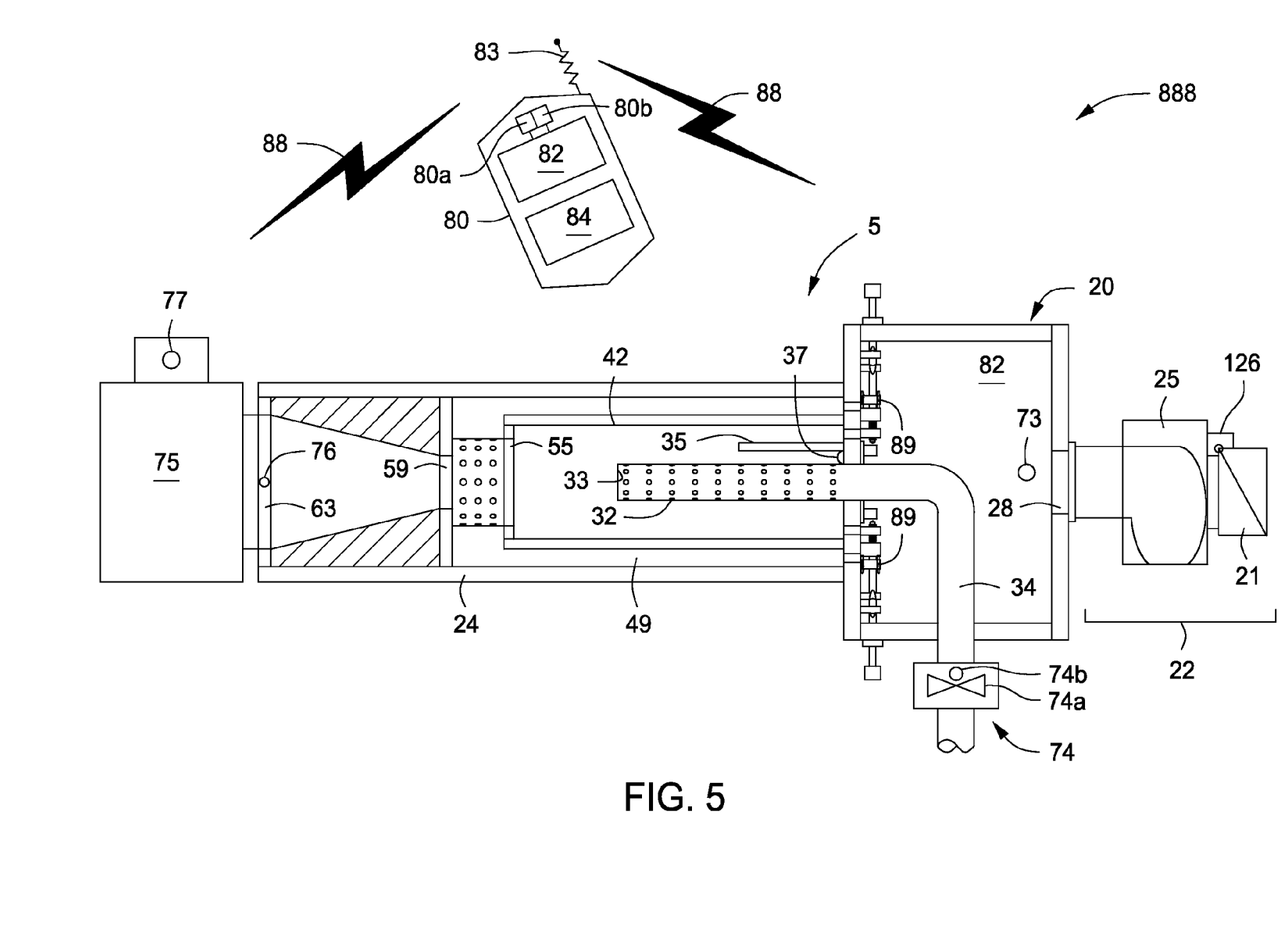
FIG. 5 is a schematic view from the side illustrating one embodiment of a combustion efficiency control system for a laminar burner system, the combustion efficiency control system controlling laminar air and fuel flows for enhancing combustion efficiency of the laminar burner system.

As shown in FIGS. 1, 3, 5, and 7, the laminar air delivery system 22 includes a damper 21 for variably collecting atmospheric air. The damper 21 is of a type well known in the industry. As discussed further below, to achieve optimal levels of combustion efficiency, the damper 21 in at least one embodiment is operatively integrated with a combustion efficiency control system 888. Through efficiency signals 88 as illustrated in FIG. 5, the combustion efficiency control system 888 regulates the rate of atmospheric air collection by the damper 21.

Atmospheric air collected by the damper 21 then travels across a delivery line 23 to a blower 25. Although shown positioned in FIG. 3 at a 90° angle relative to the blower 25, those of ordinary skill in the art will readily recognize that the delivery line 23 can be positioned at any angle with respect to the blower 25.

Figures 3, 3A:
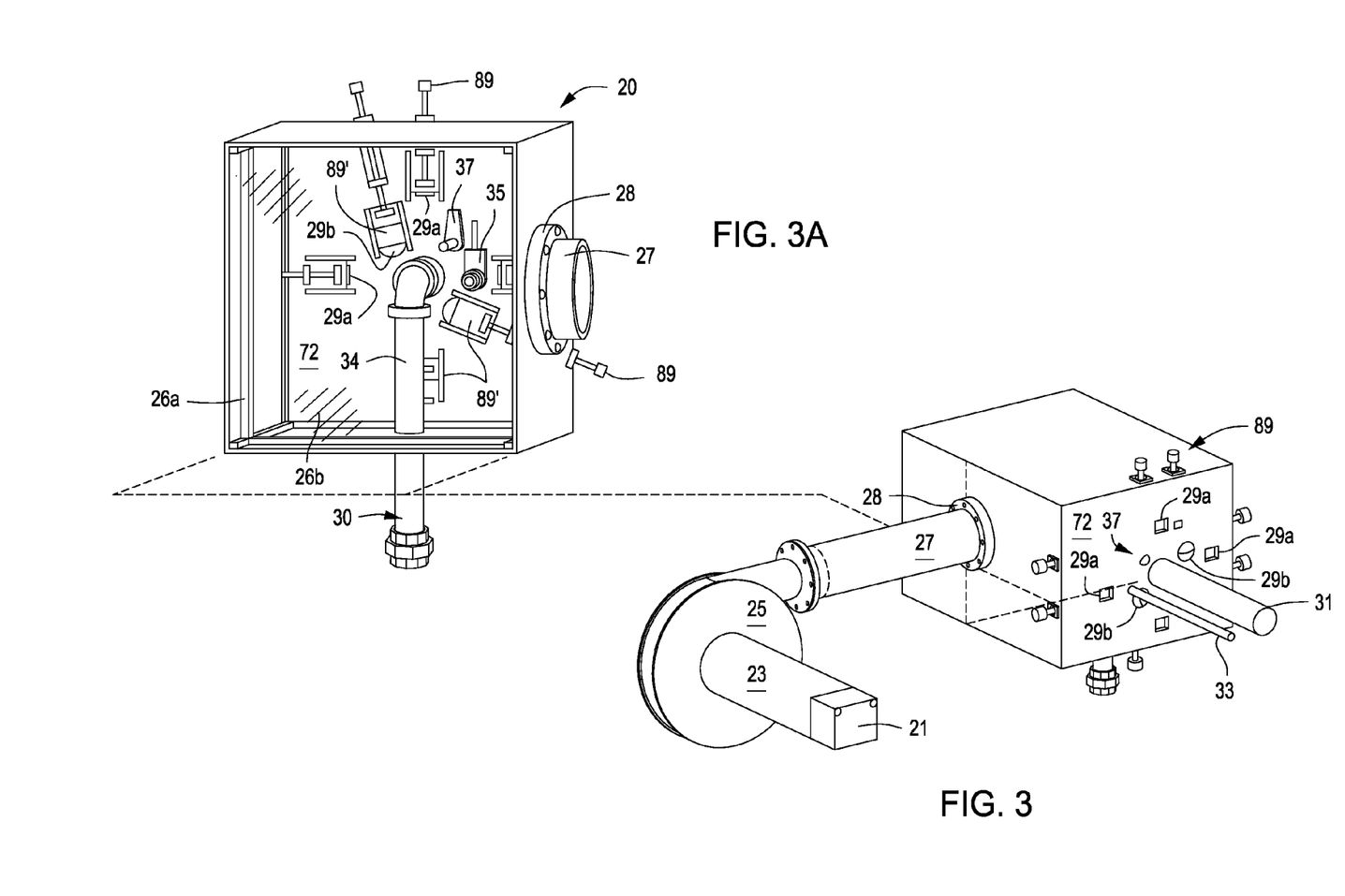
FIG. 3 is an isometric view from the side of one embodiment of a laminar air delivery system for a burner system featuring an interchangeable supply input module.
FIG. 3a is an isometric from the side illustrating an interior viewer for observing operations within the supply input module.

The blower 25 operatively accelerates the air toward the combustion manifold 70. The blower is of a type widely used in the industry, such as a centrifugal blower or fan. Air is pushed by the blower 25 through an air feed line 27 toward the supply input module 20. In at least one embodiment, the air feed line 27 is a conduit. In another embodiment, the air feed line 27 is a tube. With the air exiting the blower 25, the air feed line 27, in part, operatively establishes a laminar air intake flow stream for use with the combustion process applied within the combustion manifold 70. The air feed line 27 couples to the supply inlet chamber 20 via the air receiving port 28. The air receiving port 28 provides a sealed interface for fluid communication between the air feed line 27 and the supply inlet chamber 20.

Referring to FIGS. 1, 3, and 5, the fuel is directed across the fuel delivery system 30. In at least one embodiment, the fuel includes one or more fuels selected from the group consisting of: natural gas, processed methane, and natural gas liquids such as propane, butane, pentane, heavy fuel oil, light distillate oil and biogas. Those of ordinary skill in the art will readily recognize any fuel suitable for combusting with air or oxygen as the laminar burner system 5 operates in either low or high oxygen environments.

As illustrated in FIGS. 3 and 5, the fuel delivery system 30 includes a fuel passageway 34. The fuel passageway 34 is a hollow body for channeling fuel to the combustion manifold 70. In one embodiment, the fuel passageway 34 comprises a tube. In one embodiment, the fuel passageway 34 comprises a conduit. In operation, fuel within the fuel passageway 34 travels from a fuel source (not shown) toward the supply input module 20. Optionally, as discussed further below in reference to FIG. 5, a fuel controller unit 74 features a fuel passageway valve 74a coupled to the fuel passageway 34 to variably supply fuel to the combustion manifold 70.

The supply input module 20 features an alignment plate 72 by which the fuel passageway 34 is aligned and secured thereto. Specifically, in FIG. 1, the center of the alignment plate 72 defines an alignment axis 777 by which the fuel passageway 34 is positioned and mounted to the alignment plate 72 with respect to the alignment axis 777.

Accordingly, fuel travels from the supply input module 20 toward the combustion manifold 70 within a hollow bodied, injector device 31 as the injector device 31 provided by the fuel delivery system 30 extends outwardly from the alignment plate 72. In particular, shown in FIG. 1, the injector device 31 extends from alignment plate 72 along an air-fuel mixing chamber system 40 provided by the combustion manifold 70. Those of ordinary skill in the art will readily recognize that the injector device 31 can either be an integral portion of the fuel passageway 34 or separate unit in fluid communication with the fuel passageway 34.

The injector device 31 defines a plurality of injectors 32. In one embodiment, the injector device 31 defines a multiplicity of injectors 32, such as greater than five hundred injectors. Optionally, to facilitate a desired overall aerodynamic configuration for the injector device 31, at least one mixing outlet combustion enhancer 33 couples to and is rendered in fluid communication with the injector device 31 thereby enhancing combustion for the laminar flow burner system 5. For example, as shown for the embodiment of FIG. 1, the mixing outlet combustion enhancer 33 comprises a conic configuration that couples to the flat end of a tube defining the injector device 31 to prevent accumulation of low pressure at the flat end thereby further promoting the mixture of fuel with the laminar stream of air within the air-fuel mixing chamber.

In operation, fuel traveling within the injector device 31 exits through the injectors 32 to mix with a laminar air intake stream near the injector device 31 as the laminar air intake stream travels the along the air-fuel mixing chamber system 40. In at least one embodiment, as it defines the centerline for both the injector device 31 and the alignment plate 72, the alignment axis 777 is a spatial reference for orientating the ejected fuel as it combines with the laminar air-intake stream. Accordingly, as discussed in further detail below, fuel exits the injector device 31 to mix with the laminar air intake stream to form a first combustion stream. The fuel exits the injector device 31 perpendicular to the laminar air-intake stream traveling along the air-fuel mixing chamber system 40 to define a first combustion stream. Specifically, the positive pressure of air within the air-fuel mixing chamber system 40 is low and slow moving such that fuel exits the injector device 31 perpendicular to the laminar air-intake stream. In one alternative embodiment, the fuel exits the injector device 31 substantially perpendicular to the laminar air-intake stream traveling along the air-fuel mixing chamber system 40 to define a first combustion stream.

Shown in FIG. 3, the alignment plate further defines a plurality of inlet ports 29 that are variably exposed via inlet actuators 89 to selectively supply the laminar air-intake stream to the combustion manifold 70 at a desired quantity and flow rate. As shown, each inlet port 29 is characteristically small and narrow relative to the alignment plate 72 and configured to establish laminar fluid flow therethrough. To thereby increase energy output of the laminar burner system 5, those of ordinary skill in the art will readily recognize any suitable, well known size and configuration of each inlet port 29 to increase either the amount or flow rate of the laminar air flow stream flowing therethrough.

Illustratively, in FIGS. 1, 3, 3a, and 5, a plurality of first inlet ports 29a and a plurality of second inlet ports 29b correspondingly supply laminar streams of air from the supply input module 20 to the air-fuel mixing chamber system 40 and a stoichiometric combustion unit 50, respectively. In the illustration, each first and second inlet port 29a, 29b is operatively engaged with a corresponding sealing door 89' from a respective inlet actuator 89. The sealing door 89' is rendered from a closed position to an open position to expose the corresponding first and second inlet ports 29a, 29b for flow of the laminar air-intake stream therethrough. As the sealing door 89' moves from a closed position toward an open position, air flow through the corresponding inlet port 29 proportionately increases to operatively increase the energy output of the laminar burner system 5.

In one embodiment, the inlet actuator 89 comprises a linear actuator of a type well known in the industry for variably rendering the sealing door 89' to expose the first inlet port 29a for selectively permitting fluid flow of the laminar air-intake stream therethrough and toward the air-fuel mixing chamber system 40. Similarly, in the continuing illustration, the inlet actuator 89 renders the sealing door to variably open the second inlet port 29b for permitting fluid flow of laminar air intake stream therethrough and toward the stoichiometric combustion unit 50. As discussed further below in reference to FIG. 5, the inlet actuator 89 is responsive to efficiency signals 88 for variably controlling the flow rate of the laminar air-intake stream to optimize combustion efficiency.

The supply input module 20 further includes an air receiving port 28. Operatively, the supply input module 20 receives air from the air feed line 27 of the laminar air delivery system 22 at the air receiving port 28. In one embodiment, the air receiving port 28 diffuses the air received from the laminar air delivery system 22 across the supply input module 20.

Figure 7:
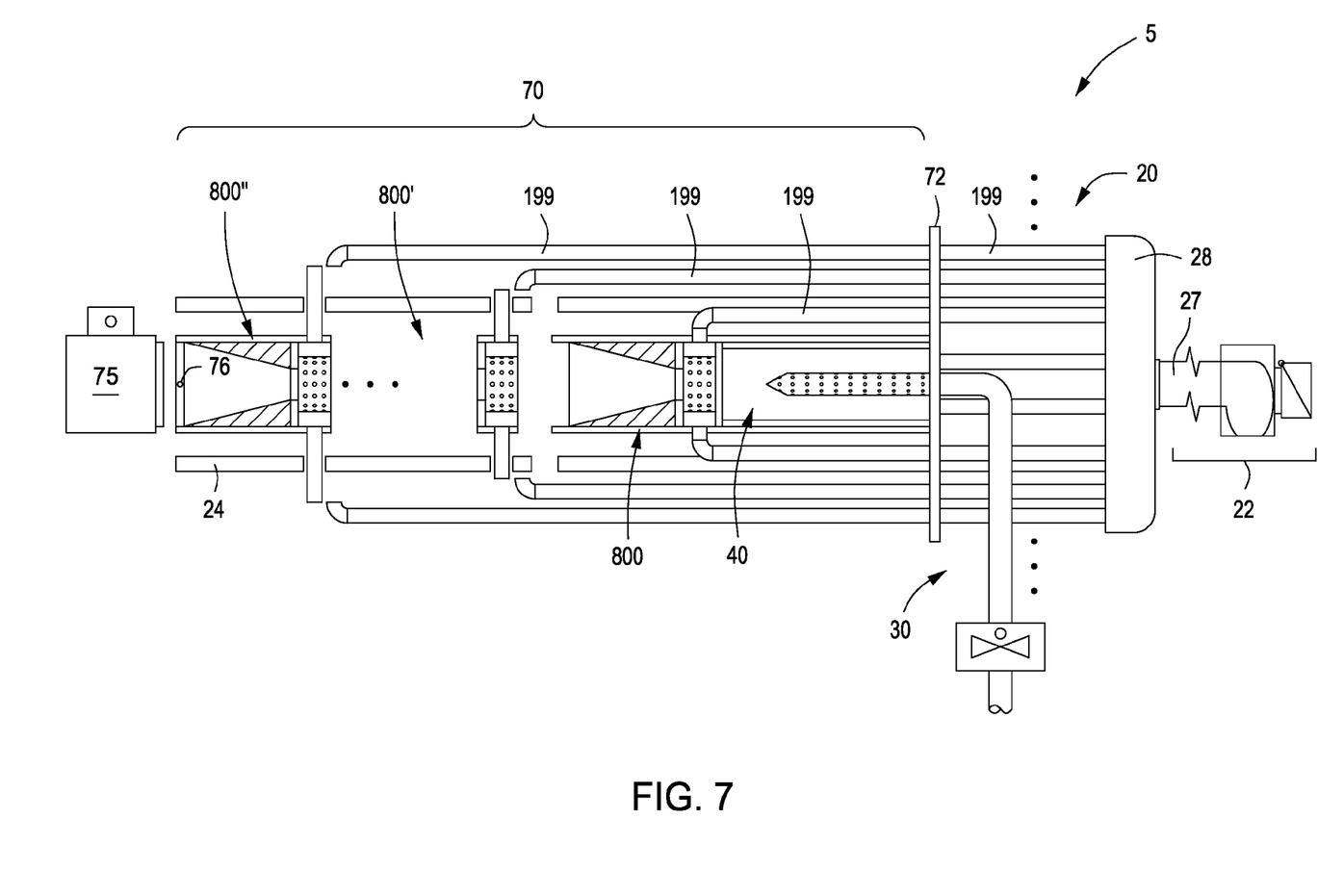
FIG. 7 is a schematic view from the side illustrating one embodiment of a burner system for quickly and accurately modifying combustion efficiency for a various applications through linking a series of interchangeable reaction efficiency modules to the system.

Illustratively, the air receiving port 28 for the embodiment of FIG. 7 diffuses air received from the laminar air delivery system 22 across a plurality of laminar staging supply lines 199 to direct a plurality of laminar air intake streams to the combustion manifold 70 that features a plurality of interchangeable reaction efficiency modules 800.

FIG. 3a shows an interior viewer 26b for observing operations within the air-fuel mixing chamber 40 and the supply input module 20 of FIG. 3. As shown, the interior viewer 26b is composed of either transparent or semi-transparent material, such as, among others, semi-transparent tinting and partial mirroring. The interior viewer 26b is held in place and positioned within the supply input module 20 by a viewer support 26a. In operation, an observer can identify many critical aspects relating to combustion, such as, among others, the flame color through the inlet ports 29a, 29b past the alignment plate 72 to visually gauge combustion efficiency; the general operability of each inlet actuator 89; and positioning with respect to the alignment axis 777 as well as the structural integrity of the air receiving port 28 and the fuel passageway 34 while secured to the supply input module 20. Illustratively, in one embodiment, an observer can identify through the interior viewer 26b the combustion flame color adjacent to a pilot unit. In one embodiment, a boiler prism sensor of a type well known in the industry is disposed within the mixing chamber 44 to gauge combustion efficiency.

In one embodiment, based on the flame color viewed, an observer can manually adjust the laminar air intake stream to correspondingly change combustion efficiency of the laminar burner system 5. For example among others, by manually interfacing with the combustion efficiency control system 888, the observer adjusts the corresponding inlet actuators 89 to change the opening of the desired inlet port 29. Illustratively, in one embodiment, ten parts of laminar air to one part of fuel is mixed within the combustion manifold 70 so that the color of the resulting combustion streams reach a very bright blue color indicative of an oxidation process where there is no more organic carbon left so that the emission output reaches a carbon dioxide level of one part per million or below.

With reference to FIGS. 1-3, 5, and 7, the combustion manifold 70 of the laminar burner system 5 is in fluid communication with the supply input module 20 to receive the laminar air intake stream and the fuel from the supply input module 20 for establishing a high efficiency combustion process. The combustion manifold 70 secures to and extends outwardly from the alignment plate 72. Moreover, the combustion manifold 70 is positioned with respect to the alignment axis 777.

Operatively, for purposes of illustration, the combustion manifold 70 can be divided in to a stoichiometric staging arrangement 45 and a refractory unit 60. Moreover, in FIG. 1, the stoichiometric staging arrangement 45 includes at least one air-fuel mixing chamber system 40 and at least one stoichiometric combustion unit 50.

In particular, the air-fuel mixing chamber system 40 includes a mixing chamber body 42. The mixing chamber body 42 is the innermost arrangement within the combustion manifold 70. The mixing chamber body 42 is fixed to the alignment plate 72 and is in fluid communication with first inlet ports 29a for receiving a laminar air intake stream from the supply input module 20. The mixing chamber body 42 is positioned with respect to the alignment axis 777 and the injector device 31.

As shown in FIG. 1, the mixing chamber body 42 defines a mixing chamber 44. In operation, fuel traveling within the injector device 31 exits through the plurality of injectors 32 to mix with a laminar air intake stream near the injector device 31 as the laminar air intake stream travels the away from the first inlet port 29 and along the mixing chamber 44.

Referring to FIGS. 1, 3, 3a, and 5, the air-fuel mixing chamber system 40 further includes a pilot unit 35 and a combustion sensor/controller unit 37 each positioned adjacent to the injector device 31 with respect to the alignment axis 777 and fixed to the alignment plate 72. The sensor/controller unit 37 is electrically coupled to the pilot unit 35 and the inlet actuators 89 for variably closing the respective inlet ports 29 and the damper 21. Moreover, the pilot unit 35 is selectively engaged by the sensor/controller unit 37 to ignite the nearby fuel based on predetermined wavelengths of light detected by the sensor/controller unit 37. The predetermined wavelengths of light correspond to the flame intensity of a first combustion stream formed within the mixing chamber 44.

To avoid the abrupt, unwanted termination of combustion associated with a false start within the laminar burner system 5, the pilot unit 35 remains engaged continuously or, alternatively, for periods greater than two minutes. Specifically, the pilot unit 35 includes an electrical resistor for igniting the fuel as the fuel contacts the hot resistor. In one embodiment, the pilot unit 35 includes outwardly extending projections 35' to facilitate rapid transfer of heat energy to the fuel. The pilot unit 35 operatively receives a voltage to generate heat energy for any desired period. The voltage is continuously applied to engage the pilot unit 35 thereby ensuring uninterrupted fuel ignition to operate the laminar burner system 5 as desired.

Illustratively, in one embodiment, about one minute elapses for the resistor to warm and thus engage the pilot unit 35. The pilot unit 35 receives fuel from adjacent injectors 32 to ignite and establish a flame. Accordingly, the sensor/controller unit 37 detects various predetermined wavelengths of light indicative of the flame color of a first combustion stream formed within the mixing chamber 44 as the fuel and the laminar air intake stream are combined. The pilot unit 35 is disengaged by the sensor/controller 37 as the sensor/controller 37 detects a predetermined wavelength of light to furthermore increase the air and fuel supply by controlling any combination of the damper 21', the fuel passageway valve 74a, and array of inlet ports 29. On average, in one embodiment, a period of seventy-five seconds elapses for the pilot unit 35 to fully engage and disengage in the manner described above.

Furthermore, in one embodiment, the electrical resistor comprises a variable resistor. In operation, the electrically engaged variable resistor ignites the fuel on contact. As such, in at least one embodiment, the variable resistor accommodates controlling fuel ignition based on a timer to selectively blow out or ignite the pilot unit 35. Moreover, in one embodiment, the resistor is composed of a metal or metal alloy, such as Ni—Cr or Al alloys, Pt, Cu, Cr metals and alloys. In another embodiment, the resistor is composed of a high temperature ceramic, such as among others nitrides, borides, carbides and oxides of Al, Ti, Mo and Zr.

As discussed below, the sensor/controller unit 37 emits and receives efficiency signals 88 associated with the combustion efficiency control system 888. The sensor/controller unit 37 detects various predetermined wavelengths of light indicative of the flame intensity of a first combustion stream formed within the mixing chamber 44 as the fuel and the laminar air intake stream are combined. Variations in flame color correspond to different levels of combustion efficiency achieved by the laminar burner system 5. Based on measured light wavelengths, the sensor/controller unit 37 emits an efficiency signal 88 to the combustion efficiency control system 888 to thereby adjust combustion efficiency. Accordingly, by way of illustration, the combustion efficiency control system 888 can emit an efficiency signal 88 for receipt by the sensor/controller unit 37 or, alternatively, directly by the inlet actuators 89 to automatically adjust the laminar air intake stream to correspondingly change combustion efficiency by changing the pilot unit's 35 period of operative engagement as a result of the sensor/controller unit 37 reading wavelengths indicative of successful combustion as the pilot unit 35 is engaged.

Operatively, as discussed above, a laminar air intake stream is preconditioned prior to entering the combustion manifold 70 of the laminar burner system 5, such as, among others, preconditioned for a specific quantity, flow rate or temperature. In one embodiment, the laminar air intake stream is preconditioned as ambient air, or alternatively oxygen, is forced through laminar air delivery system 22 to the supply input module 20. At the air receiving port 28 of the supply input module 20, the laminar air intake stream is separated to be provided to the combustion manifold 70 at different stages of the combustion process.

For example, the laminar air intake stream is divided to be provided to the air-fuel mixing chamber system 40 and to the stoichiometric combustion unit 50 via the first inlet ports 29a and the second inlet ports 29b, respectively. The air-fuel mixing chamber system 40 is in fluid communication with the supply input module 20 and includes the mixing chamber 44 and the injector device 31 extending within the mixing chamber 44. At the air-fuel mixing chamber system 40, a first combustion stream is established as fuel is discharged from the injectors 32 to mix with the laminar air intake stream traveling along the mixing chamber 44. In one embodiment, the fuel exits the injector device 31 perpendicular to the laminar air intake stream.

Referring to FIG. 1, the stoichiometric combustion unit 50 is in fluid communication with the supply input module 20 and with the air-fuel mixing chamber system 40. For the embodiment of FIG. 1, the stoichiometric combustion unit 50 includes a combustion unit body 46. The combustion unit body 46 is secured to the alignment plate 72 and positioned with respect to the alignment axis 777 so that the air-fuel mixing chamber 40 and the injector device 35 are positioned within the combustion unit body 46.

As shown in FIG. 1, the spatial gap between the combustion unit body 46 and the mixing chamber body 42 defines a staging passageway 49 for directing the laminar air intake stream therethrough. Accordingly, the second inlet ports 29b at the alignment plate 72 are positioned to supply the laminar air intake stream to the staging passageway 49.

Figure 2:
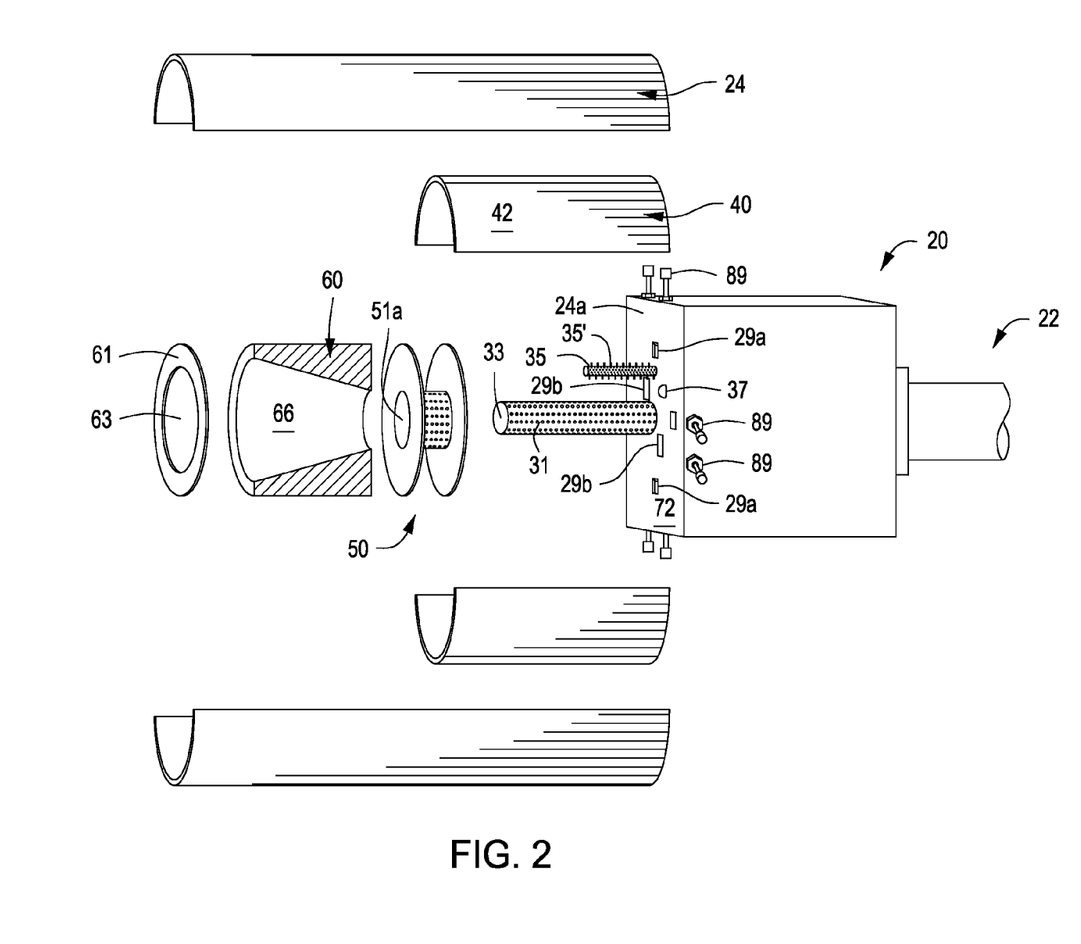
FIG. 2 is a partially exploded, schematic view from the side illustrating a laminar burner system.

Alternatively, as shown in FIG. 5, a manifold binder body 24 can be substituted for the above referenced combustion unit body 46 so that the spatial gap between the manifold binder body 24 and the mixing chamber body 42 defines a staging passageway 49 for directing the laminar air intake stream therethrough. Those of ordinary skill in the art will readily recognize various embodiments where the manifold binder body 24 can either replace or complement other container bodies while structurally supporting the combustion manifold. For example, the embodiments of FIGS. 1 and 7 show the manifold binder body 24 structurally cooperating with other container bodies to support the combustion manifold 70 as reaction efficiency modules 800 are either added or removed from the laminar burner system 5. The embodiment of FIG. 2 shows a combination the manifold binder body 24 and the mixing chamber body 42 cooperatively providing structural support to the combustion manifold 70. The embodiment of FIG. 5 shows the manifold binder body 24 as replacing other container bodies to structurally support the combustion manifold 70.

The stoichiometric combustion unit 50 further includes a stoichiometric unit body 51. The stoichiometric body 51 a hollow body that is in fluid communication with the staging passageway 49 and with the mixing chamber 44. The stoichiometric unit body 51 defines a plurality of air intakes 52. The laminar air intake stream travels from the staging passageway 49 and enters in the stoichiometric unit body 51 through the plurality of air intakes 52. Within a stoichiometric channelway 51a defined by the hollow of the stoichiometric unit body 51, as shown in FIG. 2, the laminar air intake stream from the stating passageway 49 combines with the first combustion stream that is exiting the mixing chamber 44 and traveling within a stoichiometric channelway 51a to form a second combustion stream. In effect, the air intake stream introduced through the air intakes 52 acts as an oxidizer fuel for further igniting the first combustion stream to thus form the second combustion stream having a higher temperature and less combustion waste products than the first combustion stream.

In at least one embodiment, a mixing plate 57 and a stoichiometric plate 58 are disposed on opposing sides of the stoichiometric unit body 51. The mixing plate 57 and the stoichiometric plate 58 each align the stoichiometric unit body 51 with respect to the alignment axis 777 as well as facilitate requisite fluid flow for the combustion process of the laminar burner system 5. In particular, the mixing plate 57 defines a mixing chamber outlet 55 in fluid communication with the mixing chamber 44 of the air-fuel mixing chamber system 40. The first combustion stream from the mixing chamber 44 is received at the mixing chamber outlet 55 and directed through the stoichiometric unit body 51 to the refractory unit 60. Similarly, the stoichiometric plate 58 defines a stoichiometric outlet 59 in fluid communication with the stoichiometric unit body 51. A second combustion stream exiting the stoichiometric unit body 51 is received at the stoichiometric outlet 55 and directed through the refractory unit 60.

In summary, establishing a second combustion stream with the stoichiometric combustion unit 50 is as follows. The stoichiometric combustion unit 50 is in fluid communication with the supply input module 20 and with the air-fuel mixing chamber system 40. The stoichiometric combustion unit 50 includes the staging passageway 49 and the stoichiometric unit body 51. A laminar air intake stream traveling along the staging passageway 49 passes through the stoichiometric unit body 51 at the air intakes 52 to meet with the first combustion stream within to define a second combustion stream for introduction to the refractory unit 60.

Referring to FIG. 1, the refractory unit 60 is in fluid communication with the stoichiometric combustion unit 50. In particular, the refractory unit 60 communicates with the stoichiometric combustion unit 50 at the stoichiometric outlet 59.

The refractory unit 60 features a refractory unit body 47. The refractory unit body 47 is positioned between the stoichiometric plate 58 and an outlet plate 61 at the opposing end and terminus of the laminar burner system 5 for the embodiment of FIG. 1. In at least one embodiment, the refractory unit body 47 is composed of refractory material to prevent absorption of heat energy to the refractory unit 60 as the third combustion stream travels across the refractory passageway 66. In one embodiment, the refractory unit body 47 is composed of refractory material of a type well known in the industry, such as one or more selected from the group consisting of: tungsten, molybdenum, aluminum oxide, aluminosilicates, silicon carbide, graphite, silica, magnesia, calcium oxides, and zirconia.

Shown in FIG. 1, the refractory unit body 47 defines a refractory passageway 66. The refractory passageway 66 extends through the refractory unit 60 to communicate with the stoichiometric outlet 59 and a burner system outlet 63 defined by the outlet plate 61 at the terminus of the combustion manifold 70 of FIG. 1.

Operationally, the second combustion stream travels from within the stoichiometric unit body 51 across the refractory passageway 66 to define a third combustion stream. In particular, in one embodiment, the refractory passageway 66 is conically shaped with the vertex emerging from the stoichiometric outlet 59 and the curved conic surface expanding outwardly through the refractory unit body 51.

Similar to a jet or rocket nozzle, the volumetrically expanding conic surface relieves high pressure build-up characteristic of the second combustion stream while accelerating the combustion gasses to thus form a third combustion stream. In effect, the third combustion stream promotes increased acceleration of combustion gases exiting the laminar burner system 5. Accordingly, increased exhaust acceleration provides for the continuous drawing of the fuel, the laminar intake stream, as well as the first, the second and the third combustion streams quickly through the laminar burner system without requiring additional external work during the combustion process. In at least one embodiment, the outward expansion of the conic surface defining the refractory passageway 66 is predetermined and promotes increased exhaust acceleration with negligible loss of heat energy.

Operatively, as illustrated in FIGS. 5 and 7, a refractory unit 60 is coupled to and in fluid communication with an energy consumption system 75. In one embodiment, the refractory unit 60 is releasably coupled to the energy consumption system 75. The energy consumption system 75 uses the heat energy output generated by the laminar burner system 5 for a variety of applications. Examples of the energy consumption system 75 that use the laminar burner system 5 include, among others, boilers in energy generation including heat, mechanical, and electric energy; propulsion systems including jet, rocket, and steam propulsion systems; furnaces employed in applications requiring high heat such as smelting metals and alloys, distilling chemicals, petrochemicals and gases; paper manufacturing devices; and flaring devices for oil and gas wells.

Figure 4:
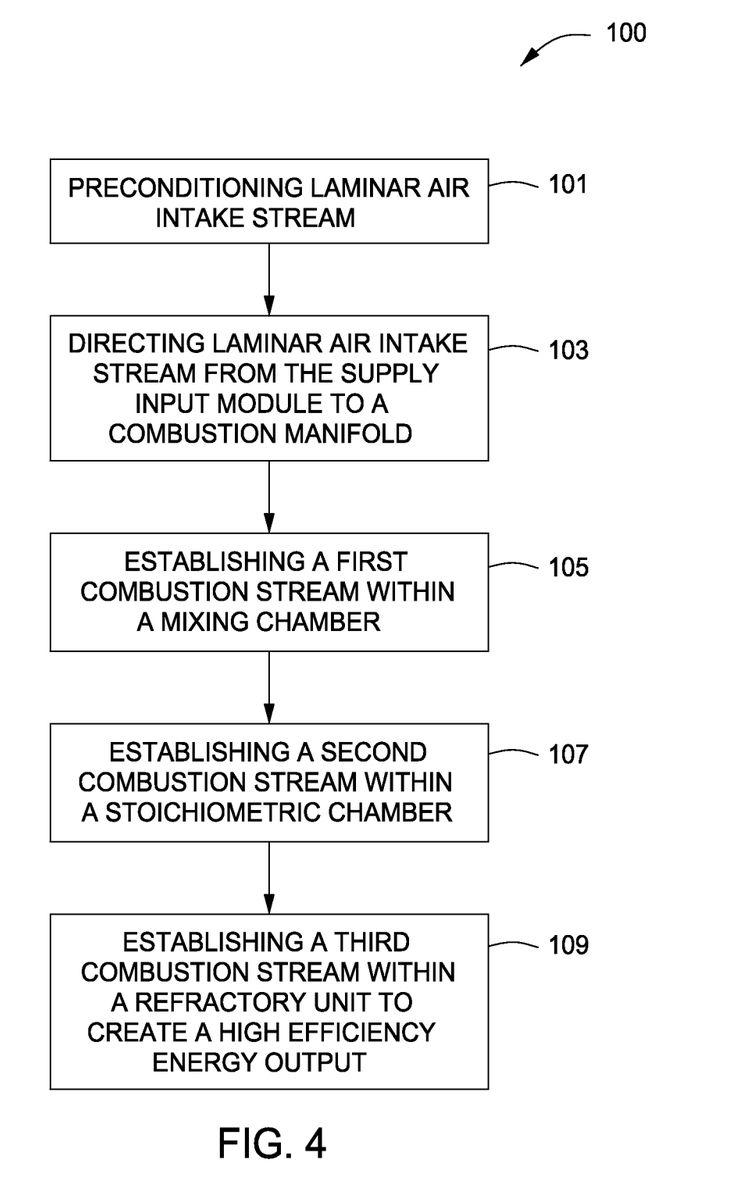
FIG. 4 is a flow diagram of a method for combustion with a laminar burner system using a laminar air intake stream.

Referring to FIG. 4, a method for combusting air and fuel with a burner system using a laminar air intake stream 100 may be appreciated as follows. In step 100, a laminar air intake stream is preconditioned prior to entering a combustion manifold 70 of the laminar burner system 5. The laminar air intake stream in step 103 is directed from the supply input module 20 to an air-fuel mixing chamber system 40. The air-fuel mixing chamber system 40 features the injector device 31 having the plurality of injectors 31 and the pilot unit 35 positioned adjacent to the injector device 31.

In step 105, a first combustion stream is established within the mixing chamber 44. In particular, the fuel is ejected from the plurality of injectors 31 to mix with the laminar air intake stream and ignited by the pilot unit 35 as the pilot unit 35 receives a voltage. The laminar air intake stream is directed from the supply input module 20 through a staging passageway 49 to a stoichiometric unit body 51.

In step 107, a second combustion stream is established within the stoichiometric combustion unit 50. Specifically, the laminar air intake stream from the staging passageway 49 is injected through the plurality of air intakes 52 of the stoichiometric unit body 51 as the first combustion stream is directed through the stoichiometric channelway 51a. In step 109, the second combustion stream is directed from the stoichiometric unit body 51 through a refractory unit 60 to establish a third combustion stream. In at least one exemplary method, the third combustion stream exits the laminar burner system 5 to define an energy output for use with an energy consumption system 75.

With reference to FIG. 7, a series of interchangeable reaction efficiency modules 800 are releasably coupled with a combustion manifold 70 for adjustably increasing combustion efficiency to accommodate a variety of industrial applications. In FIG. 7, a laminar burner system 5 includes a supply input module 20 and a combustion manifold 70 that is in fluid communication with the supply input module 20. The supply input module 20 provides fuel and a laminar air intake stream to the combustion manifold 70.

As shown, the combustion manifold 70 includes an air-fuel mixing chamber 40 in fluid communication with the supply input module 20. As described above, the air-fuel mixing chamber 40 includes a mixing chamber and an injector device extending within the mixing chamber. In operation, fuel exits the injector device to mix with the laminar air intake stream to form a first combustion stream.

The combustion manifold 70 further includes a first reaction efficiency optimization module 800. The first reaction efficiency optimization module 800 includes a first stoichiometric combustion unit in fluid communication with the supply input module 20 via a laminar staging supply line 199 provided by the air-fuel mixing chamber system 40. The first stoichiometric combustion unit includes a stoichiometric unit body, whereby a laminar air intake stream traveling along the laminar staging supply line 199 passes through the stoichiometric unit body to meet the first combustion stream within the stoichiometric unit body to define a second combustion stream.

In one embodiment, the first reaction efficiency optimization module 800 further includes a refractory unit. The refractory unit is in fluid communication with the stoichiometric combustion unit and includes a refractory passageway. In operation, the second combustion stream travels from within the stoichiometric unit body across the refractory passageway to define a third combustion stream.

For the embodiment of FIG. 7, the combustion manifold 70 includes a second reaction efficiency optimization module 800' that is releasably coupled to the first reaction efficiency optimization module 800' and in fluid communication with the supply input module 20 via staging supply lines 199. As shown, the second reaction efficiency optimization module 800' includes a stoichiometric unit body and the staging supply lines 199.

Operatively, a laminar air intake stream traveling along the staging supply lines 199 passes through the stoichiometric unit body to meet the third combustion stream within the stoichiometric unit body to define a fourth combustion stream. Optionally, although not provided for the embodiment of FIG. 7, the second reaction efficiency optimization module 800' in other embodiments further includes a refractory unit in fluid communication with the stoichiometric unit body, whereby the fourth combustion stream travels from within the stoichiometric unit body through the refractory unit to define a fifth combustion stream.

As shown, for the embodiment of FIG. 7, the combustion manifold 70 includes an $N^{th}$ reaction efficiency optimization module 800" that is releasably coupled to the second reaction efficiency optimization module 800' and in fluid communication with the supply input module 20 via staging supply lines 199. Recall that "$N^{th}$" refers to sequentially the last reaction efficiency optimization module in a series of reaction efficiency optimization modules that define a combustion manifold. Therefore, in the illustration, the $N^{th}$ reaction efficiency optimization module 800" represents the last of any desired number of reaction efficiency optimization modules after the first reaction efficiency optimization module 800 but not necessarily immediately after the first reaction efficiency optimization module 800, for example, among others, the $N^{th}$ reaction efficiency optimization module 800" can represent the second or thirty-seventh reaction efficiency optimization module.

As shown, the $N^{th}$ reaction efficiency optimization module 800" includes a stoichiometric unit body and staging supply lines 199. Operatively, a laminar air intake stream traveling within the staging supply lines 199 passes through the stoichiometric unit body to meet with the previously generated combustion stream within the stoichiometric unit body to define an $N^{th}-1$ combustion stream.

The $N^{th}$ reaction efficiency optimization 800" module further includes a refractory unit. The refractory unit is in fluid communication with the stoichiometric combustion unit and includes a refractory passageway. In operation, the $N^{th}-1$ combustion stream travels from within the stoichiometric unit body across the refractory passageway to define an $N^{th}$ combustion stream. Accordingly, a desired combustion stream or, as referenced in the continuing illustration, $N^{th}$ combustion stream produced by the laminar burner system 5 defines an energy output. The energy output is delivered to an energy consumption system 75 for use with a wide variety of industrial applications.

Furthermore, in one embodiment, a supply input module 20 of one configuration can be exchanged for another of differing configuration to accommodate demand for laminar air intake streams as varying quantities of reaction efficiency modules are either added or removed from the combustion manifold to achieve a desired combustion output. The supply input module 20 includes an air receiving port 28, an alignment plate 72, and a plurality of laminar staging supply lines 199 positioned therebetween.

Figure 7A:
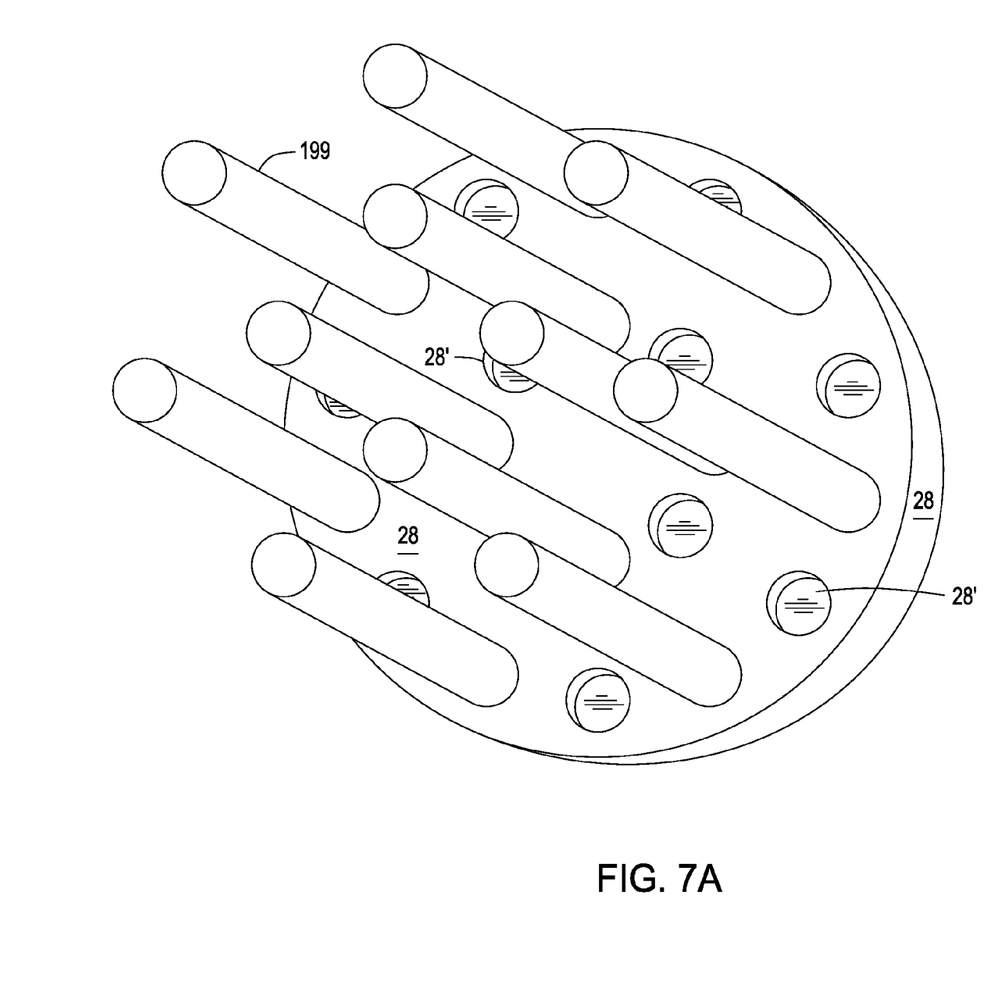

FIG. 7a shows a plurality of laminar staging supply lines 199 extending outwardly from the air receiving port 28. In effect the laminar staging supply lines 199 and the above referenced staging passageway 49 are identical in that they each operate to provide laminar air intake streams from the supply input module 20 to the combustion manifold 70. In one embodiment, the staging passageway 49 is integral with the combustion manifold 70 whereas the laminar staging supply lines 199 are configured to be removable from the combustion manifold 70.

The air receiving port 28 includes a plurality of sealed openings 28'. In operation, each seal from the sealed openings 28' can be either removed or added to accommodate insertion of a corresponding laminar staging supply line 199 at the exposed opening to thus receive a laminar air intake stream from the air receiving port 28. Seals can be removed or added depending on the desired quantity of laminar staging supply lines 199 for delivering laminar air intake streams to the combustion manifold 70.

One supply input module with one predetermined quantity of sealed openings 28' can be interchanged with another supply input module with a different predetermined quantity of sealed openings 28'. Thus, one supply input module for supplying a predefined number of laminar staging supply lines to the combustion manifold is interchangeable with another supply input module for supplying a different number of laminar staging supply lines.

A method for combusting air and fuel with a laminar burner system is appreciated as follows. An $N^{th}$ reaction efficiency optimization module 800" is coupled to a first reaction efficiency optimization module 800. The first and $N^{th}$ reaction efficiency optimization modules 800, 800" each couple to the laminar burner system 5. In one exemplary method, the first reaction efficiency optimization module 800 couples to the laminar burner system 5 as the $N^{th}$ reaction efficiency optimization module 800" couples to the first reaction efficiency optimization module 800. In many embodiments of the method, a plurality of efficiency optimization modules are coupled in series between the $N^{th}$ reaction efficiency optimization module 800" and the first reaction efficiency optimization module 800.

The laminar air intake stream from the supply input module 20 is directed to an air-fuel mixing chamber system 40 that includes a pilot unit and an injector device positioned adjacent to the pilot unit and having a plurality of injectors. The laminar air intake stream is preconditioned prior to entering a combustion manifold 70 of the laminar burner system 5. A first combustion stream is established within the mixing chamber in the same manner described above.

Another laminar air intake stream is directed from the supply input module 20 through a laminar staging supply line 199 to a stoichiometric combustion unit of the first reaction efficiency optimization module 800. A second combustion stream is established within the stoichiometric combustion unit in the same manner as described above. The second combustion stream is directed from the stoichiometric unit body through a refractory unit provided by the first reaction efficiency optimization module 800 to establish a third combustion stream.

In at least one embodiment, another laminar air intake stream is directed from the supply input module 20 to a stoichiometric unit body of the $N^{th}$ reaction efficiency optimization module 800" to meet the third combustion stream within to define a $N^{th}$ combustion stream whereby the $N^{th}$ combustion stream defines an energy output for the laminar burner system 5. In other embodiments including the embodiment of FIG. 7, the combustion process executed by the combustion manifold 70 includes at least a second reaction efficiency optimization module 800' and resulting fourth combustion stream as well as, optionally, a fifth stream if a refractory unit is included with the second reaction efficiency optimization module 800'.

In effect, combustion streams will be sequentially generated depending on the number of reaction efficiency optimization modules desired to arrive at a combustion stream for receipt by the $N^{th}$ reaction efficiency optimization module. Those of ordinary skill in the art will readily recognize that the laminar air intake stream can meet with any desired number of combustion streams before lastly defining an $N^{th}$ combustion stream. In at least one embodiment, the $N^{th}$ combustion stream 800" exits the laminar burner system 5 to define an energy output for use with an energy consumption system.

Optionally, the $N^{th}$ reaction efficiency optimization module 800" or any other reaction efficiency optimization module between the $N^{th}$ reaction efficiency optimization module 800" and the first reaction efficiency optimization module 800 is releasable from the first reaction efficiency optimization module 800. As such, interchangeability facilitates a desired combustion efficiency output as well as ease of maintenance, repair, and transportation of the laminar burner system 5.

With reference to FIG. 5, a combustion efficiency control system 888 is integrated with a laminar burner system 5. The combustion efficiency control system 888 facilitates operation of a laminar burner system 5. In at least one embodiment, the combustion efficiency control system provides operational instructions for optimizing a high efficiency combustion process in the delivery of thermal energy to an energy consumption system 75 coupled to the laminar burner system 5.

For measuring and controlling a laminar air-intake stream, the combustion efficiency control system 888 features an air flow sensor arrangement. The air flow sensor arrangement includes a supply inlet sensor 73 and an air delivery controller 126 electrically coupled to the supply inlet sensor 73. Although those of ordinary skill in the art will readily recognize other positions, the supply inlet sensor 73, in one embodiment, is electrically coupled and positioned adjacent to an air receiving port 28 and the air delivery controller 126. The air delivery controller 126 is positioned adjacent to a damper 21 and a blower 25 of the laminar air delivery system 22.

In operation, the air flow sensor arrangement measures laminar air flow and emits an efficiency signal 88 including laminar air flow input values. The air flow sensor arrangement receives efficiency signals 88 from the combustion efficiency control system 888 including laminar air flow control signals. On receiving laminar air flow control signals, the supply inlet sensor 73 and the air delivery controller 126, each of the air flow sensor arrangement, cooperate to control flow of the laminar air intake stream by adjusting the damper 21 and the blower 25.

For measuring and controlling a laminar air-intake stream, the combustion efficiency control system 888 further includes a combustion sensor/controller unit 37. The combustion sensor/controller unit 37 is positioned adjacent to the injector device 31 and fixed to the alignment plate 72 with respect to the alignment axis 777. The sensor/controller unit 37 is electrically coupled to the pilot unit 35 and the inlet actuators 89 for variably closing the respective inlet ports 29.

The sensor/controller unit 37 emits and receives efficiency signals 88 associated with the combustion efficiency control system 888. In one embodiment, the sensor/controller unit 37 and/or the fuel controller unit 74 measure the burn efficiency of the laminar air intake stream and the fuel within the mixing chamber during formation of a first combustion stream by measuring the injection of the volume by square inch, $Oz/in^2$, which should be lower when compared with other high efficiency burners. In one embodiment, the sensor/controller unit 37 and/or the fuel controller unit 74 detect various predetermined wavelengths of light indicative of the flame color of a first combustion stream formed within the mixing chamber 44 as the laminar air intake stream and the fuel are combined and emits an efficiency signal 88 including light wavelength data. Additionally, the combustion efficiency control system 888 emits an efficiency signal 88 for receipt by the sensor/controller unit 37 or, alternatively, directly by the inlet actuators 89 to automatically adjust the laminar air intake stream to correspondingly change combustion efficiency within the mixing chamber 44.

Similarly, for measuring and controlling a fuel flow, the combustion efficiency control system 888 further includes a fuel controller unit 74. The fuel controller unit 74 includes fuel passageway valve 74a and a fuel flow sensor module 74b. The fuel passageway valve 74a is coupled to the fuel passageway 34 to variably supply fuel to the combustion manifold 70. The fuel flow sensor module 74b is coupled to the fuel passageway 34 and the fuel passageway valve 74a. The fuel flow sensor module 74b measures fuel flow and emits an efficiency signal 88 including fuel flow input values. The combustion efficiency control system 888 sends efficiency signals to the fuel controller unit 74 that includes control values to control fluid flow through the fuel passageway 34 by variably operating the fuel passageway valve 74a.

For measuring and controlling the combustion energy output of the laminar burner system 5, the combustion efficiency control system 888 further includes a burner output sensor module 76. As shown, the burner output sensor module 76 is positioned outside, adjacent to the burner system outlet 63. In operation, the burner output sensor module 76 measures combustion energy output produced by the laminar burner system 5. The measured combustion energy output includes measuring the combustion efficiency of a series of combustion streams that pass through a combustion manifold 70. In one embodiment, as shown in FIG. 7, the burner output sensor module 76 measures burn efficiency of the laminar air intake stream and the fuel traveling from the air receiving port 28 and supply input module 20 through a combustion manifold 70 that includes an air-fuel mixing chamber system 40 and a plurality reaction efficiency optimization modules having a combination of stoichiometric combustion and refractory units.

Operatively, the burner output sensor module 76 measures the combustion energy output of the laminar burner system 5 and, as a result, emits an efficiency signal 88 to the combustion efficiency control system 888. In at least one embodiment, the resulting efficiency signal 88 includes combustion output values.

The combustion efficiency control system 888 compares combustion output values and generates an efficiency signal 88 having a combination of air and fuel control data. A combination of the fuel controller unit 74, the sensor/controller unit 37, the inlet actuators 89, and the air flow sensor arrangement receive efficiency signals 88 from the combustion efficiency control system 888 that include control values for variably operating the fuel passageway valve 74*a* to control fuel flow therethrough and/or the air delivery controller 126, the blower 25, and at the inlet ports 29 to control air intake streams therethrough. In one embodiment, the combustion efficiency control system 888 emits an efficiency signal 88, for automatically adjusting the laminar air intake stream to correspondingly change combustion efficiency. On receiving laminar air flow control signals, the flow sensor arrangement engages the supply inlet sensor 73 and the air delivery controller 126 to cooperatively control flow of the laminar air intake stream by adjusting the damper 21 and the blower 25, respectively.

As shown in FIG. 5, the combustion energy output is received by the energy consumption system 75 and applied to a variety of industrial applications. The energy consumption system 75 includes an inlet for receiving the combustion energy output from the laminar burner system 5. As shown in FIG. 5, the energy consumption system 75 further includes an outlet. A system output sensor module 77 is coupled to the energy consumption system outlet. The system output sensor module 77 measures energy used by the energy consumption system 75. As such, the measured used energy values are incorporated with an efficiency signal 88 for emission by the system output sensor module 77 to the combustion efficiency control system 888.

The combustion efficiency control system 888 compares used energy values from the system output sensor module 77 with combustion output values from the laminar burner system 5. Accordingly, the combustion efficiency control system 888 generates an efficiency signal 88 having a combination of air and fuel control data for variably adjusting the combustion energy output efficiency of the laminar burner system 5 as applied to the energy consumption system 75.

Further referring to FIG. 5, the combustion efficiency system 888 includes an operating unit 80 for operative engagement with the laminar burner system 5. In one embodiment, the operating unit 80 is a portable device, for example, among others, a hand-held electronic device. In another embodiment, the operating unit 80 is a stationary device.

The combustion efficiency system 888 further includes an emitter/receiver 83 coupled to the operating unit 80. In one embodiment, the emitter/receiver 83 receives fuel and air flow input values included with the corresponding efficiency signal 88 for use by the operating unit 80. Similarly, in one embodiment, the emitter/receiver 83 receives an efficiency signal 88 including the burn efficiency values of fuel and laminar air within the mixing chamber 44 to form a first combustion stream. In one embodiment, the emitter/receiver 83 receives an efficiency signal 88 including combustion energy output produced by the laminar burner system 5. In one embodiment, the emitter/receiver 83 receives an efficiency signal 88 including values associated with energy used by the energy consumption system 75.

With specific reference to FIG. 5, the operating unit 80 includes at least one processor 80*a* and at least one corresponding memory 80*b*. The operating unit 80 includes an input/output interface 84 coupled to the processor 80*a*, the memory 80*b*, and the emitter/receiver 83. As shown in FIG. 5, the operating unit 80 further includes a display 82 coupled to the input/output interface 84, the processor 80*a*, the memory 80*b*, and the emitter/receiver 83.

In operation, in one embodiment, the input/output interface 84 receives a manual input thereon. In one embodiment, the input/output interface 84 and the display 82 cooperate to receive and display an output generated by the operating unit 80, such as, among others, providing the combustion efficiency of the laminar burner system 5 in real time on the display 82.

In one embodiment, the processor 80*a* and the corresponding memory 80*b* from the operating unit 80 operatively cooperate to compare laminar air flow and fuel flow input values with combustion output values. In one embodiment, the laminar air flow and fuel flow input values are compared with predetermined combustion output values stored in the memory 80*b* to generate the efficiency signal 88 having a combination of air and fuel control data. Alternatively, the operating unit 80 compares the fuel and air flow input values with stored combustion values collected from efficiency signals 88 received from sensors positioned about the laminar burner system 5.

In one embodiment, the laminar air flow and fuel flow input values are compared with combustion output values collected in real time from the burner output sensor module 76, the system output sensor module 77, the sensor/controller unit 37 or any other well known sensor in the industry recognized by those of ordinary skill in the art for measuring combustion. For example, among others, the operating unit 80 compares the fuel and air flow input values with combustion output values provided by the efficiency signal 88 received from the burner output sensor module 76 to generate the efficiency signal 88 having a combination of air and fuel control data.

The combustion efficiency control system 888 generates an efficiency signal 88 having a combination of air and fuel control data. Accordingly, the efficiency signal 88 provides control information for recalibrating air and fuel flows with respect to a desired combustion efficiency. In one embodiment, the operating unit 80 generates and emits an efficiency signal 88 having a combination of air and fuel control data for receipt by a fuel controller unit 74, an air delivery controller 126, and a combustion sensor/controller unit 37 for selective activation thereof to control the supply of fuel and laminar air intake streams to the combustion manifold 70.

Figure 6:
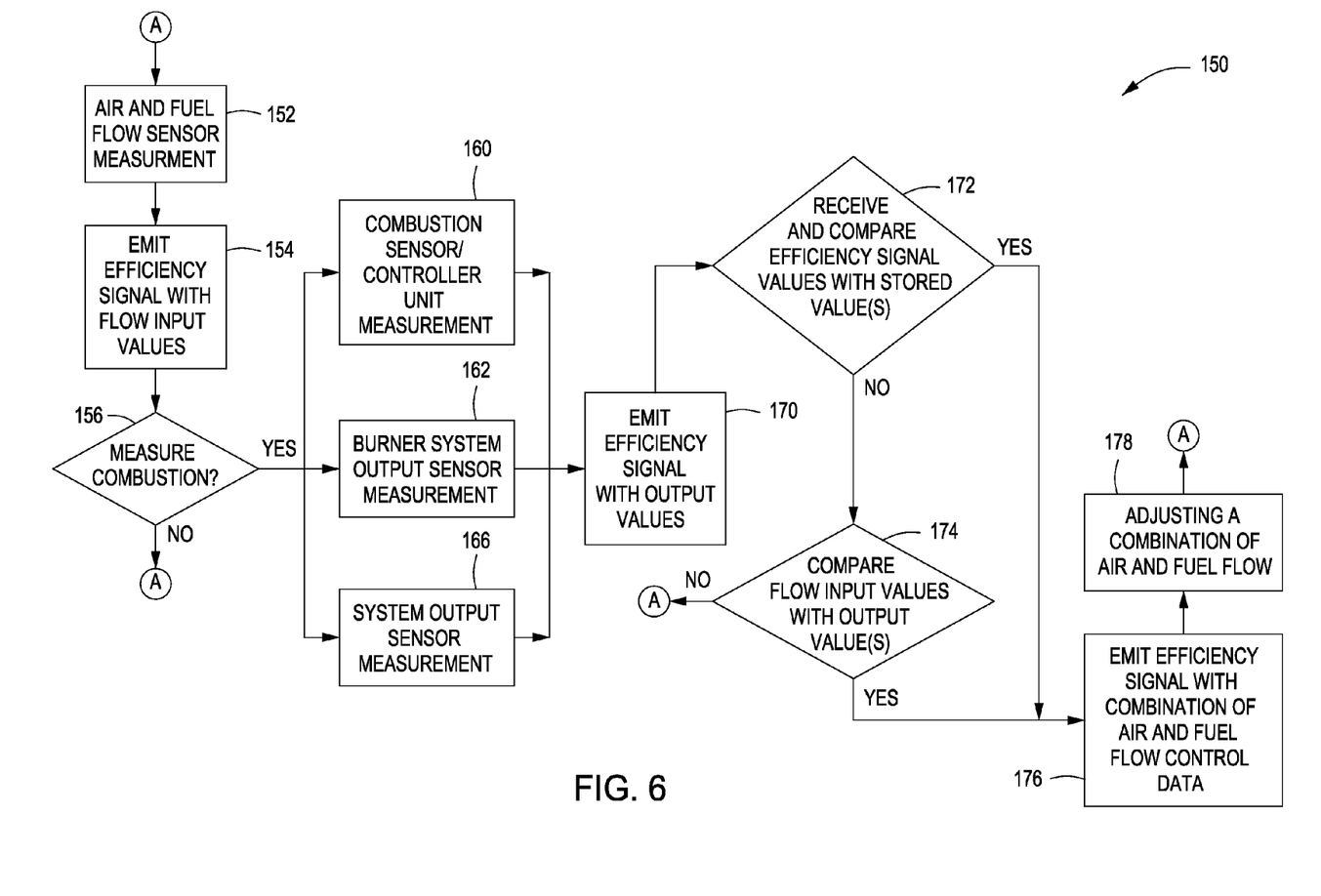
FIG. 6 is a flow diagram of method for controlling combustion efficiency for a laminar burner system.

A method for controlling combustion efficiency for a laminar burner system 150 is appreciated as follows. As shown in FIG. 5, the laminar burner system 5 delivers thermal energy to an energy consumption system 75 coupled thereto. Referring to FIG. 6, the method 150 begins as air and fuel flow sensor measurements are obtained from the laminar burner system 5. In step 154, the laminar burner system 5 emits efficiency signals including flow input values to the combustion efficiency control system 888.

Referring to step 156, sensors positioned about the laminar burner system 5 and, optionally, the energy consumption system 75 measure combustion efficiency of the laminar burner system 5. Accordingly, the sensors emit efficiency signals 88 including combustion output values to the combustion efficiency control system 888.

In one exemplary method, steps 160-166 provide various means for collecting combustion output values with the laminar burner system of FIG. 5 although those of ordinary skill in the art will readily recognize other means for collecting combustion output values. Specifically, in step 160, the sensor/controller unit 37 obtains combustion measurements for incorporation with an efficiency signal 88. In step 162, the burner system output module 76 obtains burner system combustion output measurements for incorporation with an efficiency signal 88. Similarly, in step 166, system output sensor module 77 obtains system energy output measurements for incorporation with an efficiency signal 88.

In step 170, the respective sensors emit efficiency signals 88 including output values. The combustion efficiency control system 888 receives evaluates the efficiency signals 88. In one exemplary method, the processor 80*a* in step 172 compares efficiency signal values with stored values in memory 80*b*, for example, among others, predetermined values stored in memory or values previously collected from the sensor output values that are stored in memory. Alternatively, the processor 80*a* in step 174 compares efficiency signal values for air and fuel flow input with combustion output and energy consumption values each collected by the respective sensors to thus compare real time values.

As a result, in step 176, the combustion efficiency control system 888 emits efficiency signals 88 including a combination of air and fuel flow control data to the laminar burner system 5. In step 178, the laminar burner system 5*a* adjusts for any combination of subsequent air and fuel flows based on the received efficiency signals 88.

Although the present invention has been described in detail, it should be understood that various changes, substitutions, and alterations could be made hereto without departing from the spirit and scope of the invention as defined by the appended claims.

I claim:

1. A combustion efficiency control system comprising:
   a laminar air delivery system;
   a combustion manifold, the combustion manifold in fluid communication with the laminar air delivery system;
   the laminar air delivery system providing a plurality of laminar air streams through inlets to the combustion manifold,
   the combustion manifold includes
   an air-fuel mixing chamber system, the air-fuel mixing chamber system in fluid communication with the laminar air delivery system, and
   includes a mixing chamber and an injector device extending within the mixing chamber,
      whereby fuel exits the injector device to mix with a laminar air intake stream from the plurality of laminar air intake streams traveling along the air-fuel mixing chamber to define a first combustion stream, and
   a stoichiometric combustion unit, the stoichiometric combustion unit in fluid communication with the laminar air delivery system and with the air-fuel mixing chamber system; and
   a sensor/controller unit, the sensor/controller unit is electrically coupled to inlet actuators, at the inlets of the combustion manifold, the sensor/controller unit controls the inlet actuators to open and close corresponding inlet ports as the plurality of laminar air intake streams from the laminar air delivery system are received at the inlet ports,
      the sensor/controller unit receives various predetermined wavelengths of light of a flame color, formed within the mixing chamber, of the first combustion stream and adjusts the laminar air intake stream by sending an efficiency signal to the inlet actuators to correspondingly change combustion efficiency within the mixing chamber.

2. The combustion efficiency control system according to claim 1 wherein the laminar air delivery system includes a damper and an air delivery controller, and wherein the damper is electrically coupled to the air delivery controller, the air delivery controller receives a damper efficiency signal to control the flow of the laminar air intake stream by adjusting the damper.

3. The combustion efficiency control system according to claim 1 further including an air delivery controller and a blower, the air delivery controller is electrically coupled to the blower, and wherein the air delivery controller receives a blower efficiency signal to control the flow of the laminar air intake stream by adjusting the blower.

* * * * *